April 17, 1951      S. APOSTOLESCU      2,549,407
HELICOPTER ROTOR CONSTRUCTION

Original Filed Dec. 2, 1944      3 Sheets-Sheet 1

INVENTOR.
STEFAN APOSTOLESCU
BY
ATTORNEY.

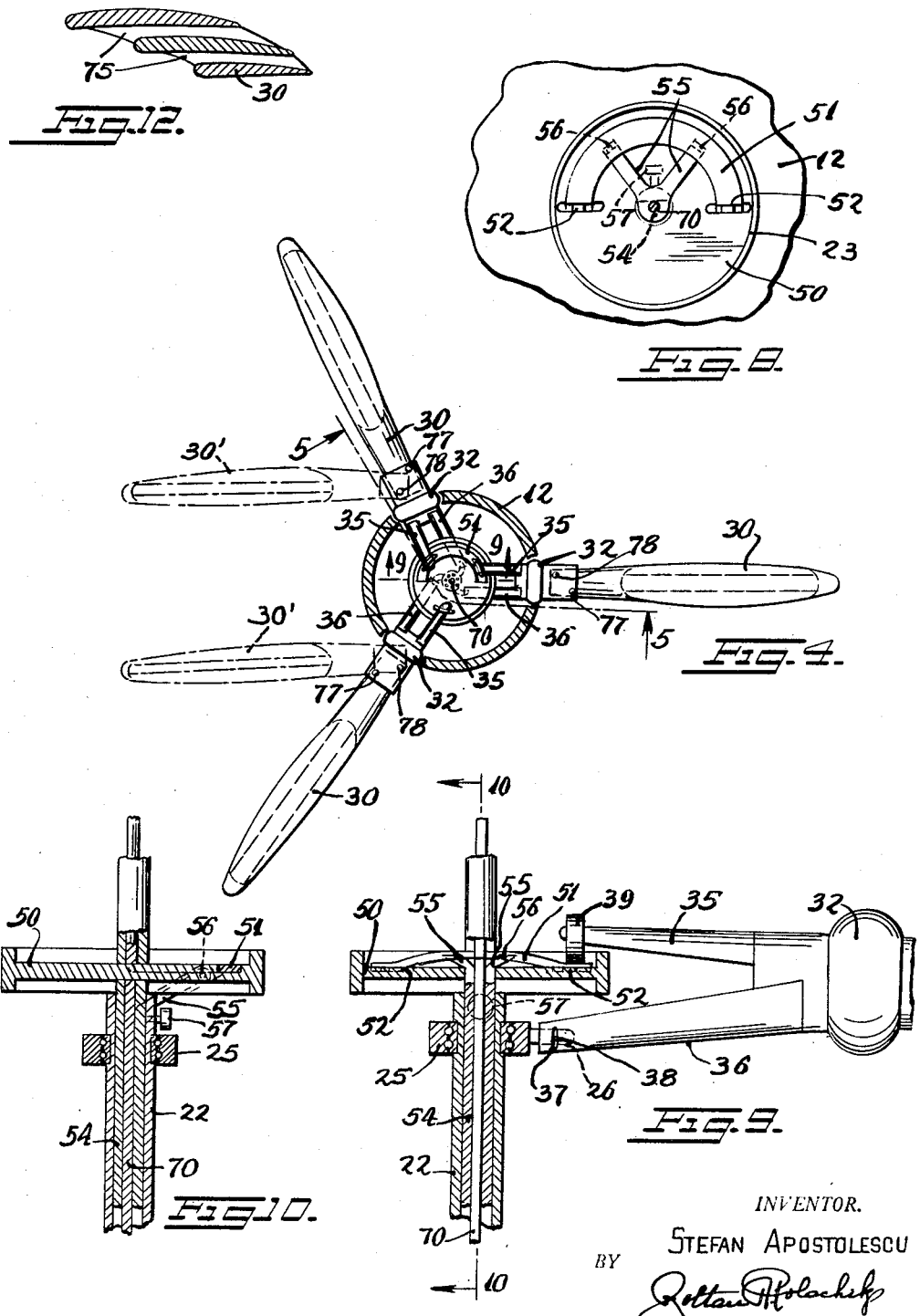

April 17, 1951 S. APOSTOLESCU 2,549,407
HELICOPTER ROTOR CONSTRUCTION
Original Filed Dec. 2, 1944 3 Sheets-Sheet 3
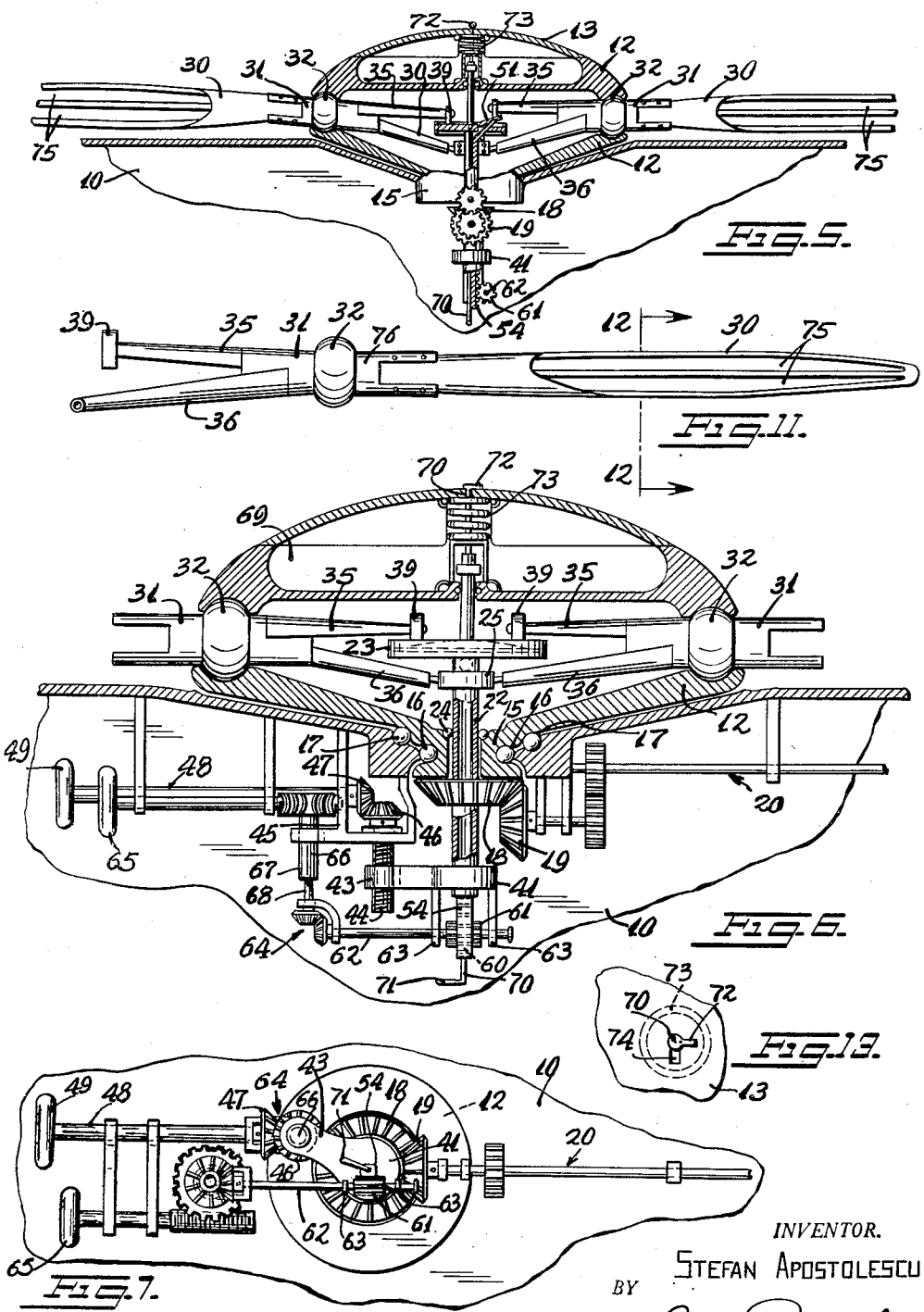
INVENTOR.
STEFAN APOSTOLESCU
BY
ATTORNEY Patented Apr. 17, 1951

2,549,407

UNITED STATES PATENT OFFICE 2,549,407

HELICOPTER ROTOR CONSTRUCTION

Stefan Apostolescu, New York, N. Y.

Substituted for abandoned application Serial No. 566,324, December 2, 1944. This application June 2, 1948, Serial No. 30,660

2 Claims. (Cl. 170—160.42)

This invention relates to new and useful improvements in a helicopter rotor construction. The present application is a substitute for my abandoned application Serial No. 566,324 filed December 2, 1944.

More particularly, the invention proposes an improved helicopter which is capable of exceptional maneuverability. It is contemplated to so construct the helicopter that it may be used in conjunction with any type of body as for example, a body designed for land operation, a body designed for water operation or a body designed for combined land and water operations. The design is also applicable for skis when operating on snow or ice.

More particularly, the invention proposes a certain construction of the helicopter rotors. It is proposed that each rotor be of dome shape, and have a number of radially projecting blades, preferably three. It is proposed to so arrange the parts that the blades may be controlled, together or separately as to angle of pitch and angle of incidence.

A simple effective wing mechanism is proposed for this purpose. With the improved helicopter rotor mechanism, it is possible that the helicopter be provided with one rotor or more than one rotor. The rotors may be operated individually or simultaneously for assisting steering the helicopter, and generally aiding in maneuvering the craft.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a fragmentary horizontal sectional view through one of the drums of the helicopter rotor.

Fig. 5 is a fragmentary vertical sectional view taken substantially on the line 5—5 of Fig. 4.

Fig. 6 is a fragmentary enlarged detailed view of a portion of Fig. 5.

Fig. 7 is a bottom plan view of Fig. 6.

Fig. 8 is a fragmentary plan view of the disc-like cam shown in Fig. 9.

Fig. 9 is a fragmentary vertical sectional view taken substantially on the line 9—9 of Fig. 4, with certain parts not shown in section for clarity of illustration.

Fig. 10 is a vertical sectional view taken on the line 10—10 of Fig. 9.

Fig. 11 is a side elevational view of one of the rotors per se.

Fig. 12 is a sectional view taken on the line 12—12 of Fig. 11.

Fig. 13 is a partial plan view looking in the direction of the line 13—13 of Fig. 5.

Figure 1:
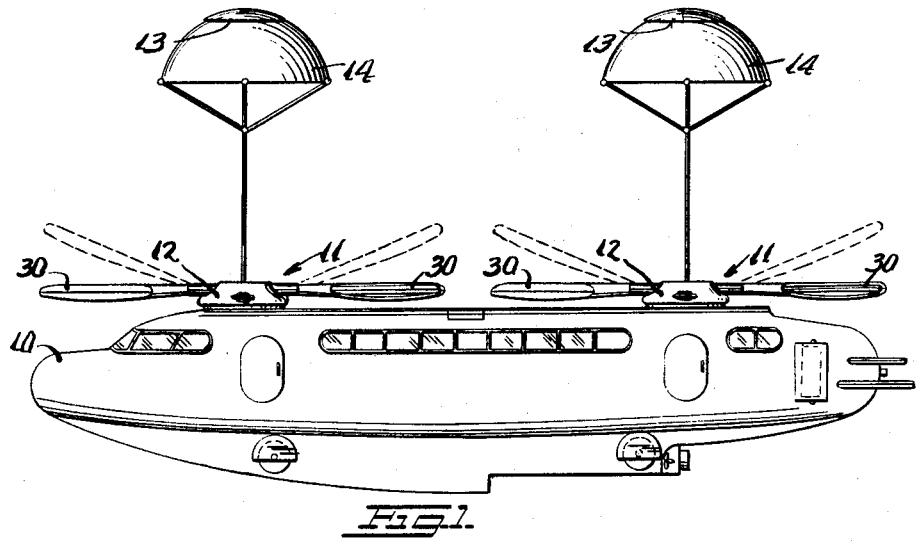
Fig. 1 is a side elevational view of a helicopter constructed in accordance with this invention.
Figure 2:
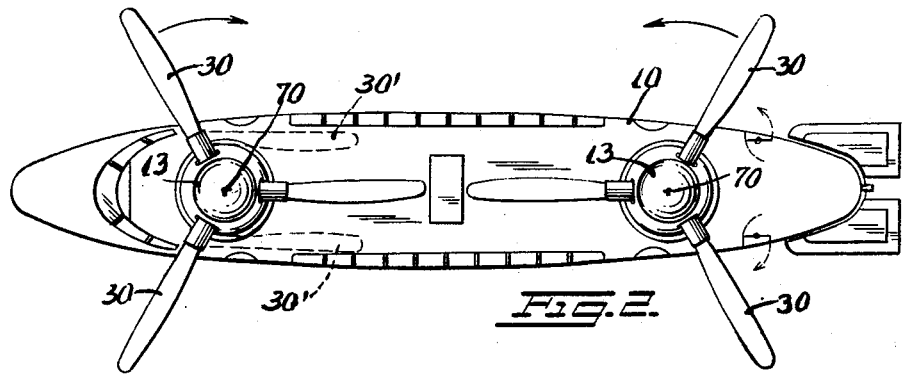
Fig. 2 is a plan view of Fig. 1.

The helicopter construction in accordance with this invention, includes a body 10 of any design and construction intended for operating from water, or land and provided with two helicopter rotors 11. These helicopter rotors 11 are arranged one at the front and the other at the rear. Each helicopter rotor 11 is provided with a hollow dome-shaped drum 12 having a top opening closed by a cover 13 which may be lifted, as shown in Fig. 1. The dome-shaped drums 12 have top hollows normally closed by said covers 13, and normally containing parachutes 14 which may be released so that they open up during distress, to add to the buoyancy of the helicopter.

Each helicopter rotor 11 has its drum 12 rotatively mounted on the top of the body 10 of the helicopter. Each drum 12 has a coaxial tubular shaft portion 15 by which it may be rotated. Bearings 16 are provided for turnably supporting the tubular shaft portion 15. The drum 12 is also rotatively supported on the body 10 with ball bearings 17.

Each drum 15 is associated with drive means. This drive means includes a bevel gear 18 fixedly mounted upon the bottom of the tubular shaft portion 15 and meshing with a bevel gear 19 of a transmission 20 which connects with a driving engine or motor (not shown on the drawings).

A tube 22 is engaged through the tubular shaft portion 15 and is formed with a top disc-like cam portion 23 located within the drum 12. A small ball bearing 24 acts between the tubular shaft portion 15 and the tube 22 to facilitate rotatively supporting said drum 12. A collar 25 is rotatively mounted on the tube 22 and is also located within the drum 12. This collar 25 is positioned below the cam-like portion 23.

The collar 25 has several radially projecting fingers 26, one finger for each blade of the helicopter rotor. For example, if the helicopter rotor has three blades with two arms each, then there are three projecting fingers 26 for connecting the rotors with the collar 25.

A plurality of helicopter blades 30, preferably three in number, have shank portions 31 extending substantially radially into said drum 12. These shank portions 31 are universally supported at the point where they enter the drum 12. A universal bearing 32 is shown for this purpose. The particular design and construction of the bearing is not important in as far as this invention is concerned. It is merely necessary that each shank 31 is capable of rotating and being pivoted upwards and downwards, and in other directions if need arises.

The inner end of each shank 31 is formed with two arms indicated by the numerals 35 and 36. Each arm 36 is turnably mounted on one of the fingers 26. For this reason each arm 36 has a small slot 37 which is engaged by a small pin 38, projecting from the finger 26. Each arm 35 has a roller 39 upon its inner end which rests upon and engages the disc-like cam portion 23.

The tube 22 is associated with means by which it may be raised and lowered. This means includes a collar 41 fixedly mounted upon the bottom of the tube 22. The collar 41 is provided with a lug 43 threadedly engaged by a threaded stud 44 rotatively supported in a bracket 45. A bevel gear 46 on the stud 44 meshes with a bevel gear 47 on a rotatively supported shaft 48. A hand wheel 49 is provided on the shaft 48 by which it may be turned, for turning the stud 44 to raise and lower the tube 22.

When the tube 22 is moved upward or downward, the collar 25 and the disc-like cam portion 23 will be correspondingly moved. The arms 35 and 36 will follow the collar 25 and the disc-like cam 23, and the outer extremities of the blades 30 will be reversely moved, upward or downward, as desired. During flight, air pressure against the blades of the helicopter rotor, will maintain the rollers 39 against the disc-like cam portion 23.

The disc-like cam portion 23 has a flat top face 50. In addition, the flat top face 50 is provided with a track-like cam member 51. This track-like cam member 51 extends through 180 degrees. It is hingedly mounted at its ends by the hinges 52. Moreover, the track-like cam member 51 is capable of being hinged upward and downward. It is illustrated in a down position. A rod 54 is slidably mounted through the tube 22, and has a forked top end 55, the ends of which are hingedly connected by small hinges 56 with the cam member 51. The rod 54 has a roller 57 fixed in between the disc-like cam 23 and the collar 25. When the rod 54 is moved downward, the roller 57 will engage the collar 25 and maintain a fixed distance from the arms 36. The arms 35, with rollers 39, will roll over the flat face of the disc cam 23 and the blades 30 will maintain a fixed angle of incidence of the pitch. This position is used only during the raising of the helicopter or when it is kept in the air in stationary position. The arrangement is such that when the rod 54 is moved upward, the cam member 51 is hinged upward, and when the rod 54 is moved downward, the cam member 51 is hinged downward.

The rod 54 is associated with means by which it may be conveniently raised or lowered. For this reason the bottom of the rod 54 is formed with rack teeth 60. A pinion 61 meshes with the teeth 60. This pinion is fixed on a shaft 62 which is rotatively supported in bearings 63 mounted upon the bottom of the collar 41. The shaft 62 connects up with a transmission 64 which terminates in hand wheel 65 which may be turned, for indirectly turning the pinion 61 to raise or lower the rod 54. The transmission 64 includes a vertical shaft 66 made from telescopic sections 67 and 68 which vary in height when the collar 41 is raised or lowered. While the sections 67 and 68 are slidable, they are non-rotatively connected, as for example they may be square in cross section. For this reason the shaft 66 will transmit rotations while at the same time permitting the collar 41 to be moved upward and downward.

It is pointed out that the top portion of the drum 12 is provided with a hollow chamber 69 in which the parachute 14 may be folded and stored and anchored so as to be ready for use when needed.

A stem 70 extends rotatively and slidably through the rod 54 and is provided at its bottom end with a handle 71 by which the stem 70 may be turned and pulled. The top end of the stem 70 extends through the top cover 13 and is formed with a key 72 for holding the cover 13 closed against the action of an expansion spring 73. The cover 13 is formed with a key opening 74 and when the key 72 is aligned with the key opening 74, the cover 13 will be free to be urged to an open position by the spring 73.

Each rotor blade 30 is formed with horizontal passages 75. The inner end of each blade is disposed in a horizontal U-shaped bracket 76 formed on the adjacent shank portion 31. A pin 78 pivotally supports each blade 30 on its respective bracket 76, and a removable pin 77 holds each blade 70 in a fixed position, or may be removed, freeing the respective blade 30 to be pivoted to the inoperative position shown by dot and dash lines 30 in Fig. 4.

The operation of the helicopter is as follows:

The wheel 65 may be turned in one direction or the other so as to indirectly raise or lower the rod 54 of one of the helicopter wings. Raising and lowering the rod 54 causes raising or lowering of the cam member 51. This controls the pitch of the helicopter blades. During rotation of the drum 12, the roller 39 of the arm 35 of each blade 30 will move upward and downward following the cam member 51 and the pitch of the blade will be varied by this arrangement. The blades may be operated to drive forward or rearward, or upward or downward, as desired.

Figure 3:
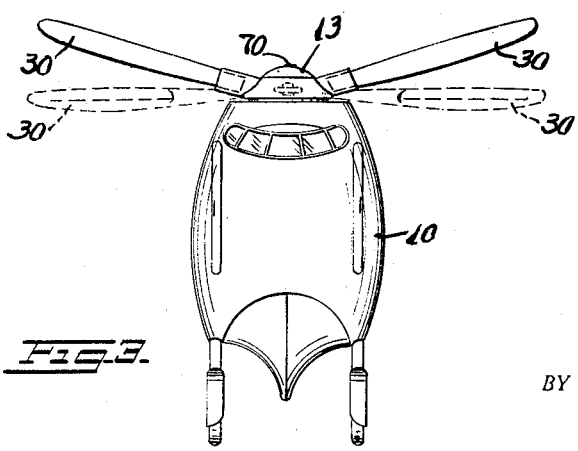
Fig. 3 is a front elevational view of the helicopter shown in Fig. 1.

The drum 46 may be operated to indirectly raise or lower the tube 22. This will indirectly raise or lower the collar 25 and the disc-like cam 23. This adjustment will vary the angle of incidence of the helicopter blades 30. By this, we mean, it will vary the upward and downward tilt of the blades 30 as schematically illustrated in Figs. 1 and 3.

The engine or motor drives the transmission 20, which in turn drives the drum. Because the drum 12 rotates, the helicopter blades 39 will also rotate along with the drum. During said rotation, the collar 25 is dragged along.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a helicopter rotor having a hollow drum rotatively mounted about a non-rotative tube which rotatively carries a collar and a plurality of rotor blades universally extended through the side walls of the drum and having their inner ends pivotally mounted on the collar forming a turning point about which the rotor blades can be turned on a longitudinal axis for varying their pitch angle, a disc-like cam portion mounted on the tube within the hollow drum, an arm extending from the inner end of each of the blades and having its free end overhanging the top face of said cam portion, a roller mounted on the free end of each of said arms to roll on the top face of said cam portion as the drum and rotor blades rotate, a cam member pivotally mounted on the top face of said cam portion to be traversed by said rollers as the drum and rotor blades rotate about the tube, and means for raising and lowering said cam member relative to said cam portion during rotation of the drum and rotor blades to vary the pitch of the rotor blades, said raising and lowering means comprising a rod slidable in the tube, said rod having a forked upper end extended from the tube and pivotally attached to said cam member, and means for raising and lowering said rod.

2. In a helicopter rotor having a hollow drum rotatively mounted about a non-rotative tube which rotatively carries a collar and a plurality of rotor blades universally extended through the side walls of the drum and having their inner ends pivotally mounted on the collar forming a turning point about which the rotor blades can be turned on a longitudinal axis for varying their pitch angle, a disc-like cam portion mounted on the tube within the hollow drum, an arm extending from the inner end of each of the blades and having its free end overhanging the top face of said cam portion, a roller mounted on the free end of each of said arms to roll on the top face of said cam portion as the drum and rotor blades rotate, a cam member pivotally mounted on the top face of said cam portion to be traversed by said rollers as the drum and rotor blades rotate about the tube, and means for raising and lowering said cam member relative to said cam portion during rotation of the drum and rotor blades to vary the pitch of the rotor blades, said raising and lowering means comprising a rod slidable in the tube, said rod having a forked upper end extended from the tube and pivotally attached to said cam member, said rod having its lower end projected from the bottom end of the tube, a rack formed on the projected lower end of said rod, a rotatively supported pinion meshing with said rack, and a transmission terminating in a manually rotative hand wheel for turning said pinion in one direction or the other to raise or lower said rod.

STEFAN APOSTOLESCU.

REFERENCES CITED

The following references are of record in the file of this patent:

UNITED STATES PATENTS

| Number | Name | Date |
|---|---|---|
| 2,384,445 | Apostolescu | Sept. 11, 1945 |
| 2,389,798 | Main | Nov. 27, 1945 |
| 2,394,846 | Cox | Feb. 12, 1946 |
| 2,427,936 | Wales | Sept. 23, 1947 |
| 2,437,165 | Locke | Mar. 2, 1948 |
| 2,448,073 | Bendix | Aug. 31, 1948 |